United States Patent [19]

Taniyama et al.

[11] 3,967,249

[45] June 29, 1976

[54] PRIORITY SELECTION SYSTEM IN ACCESS CONTROL

[75] Inventors: Yukio Taniyama; Tetsuo Isaka, both of Yokohama; Tetsuo Nagahori, Kawasaki; Kaoru Kanda, Yokohama, all of Japan

[73] Assignee: Fujitsu Ltd., Kawasaki, Japan

[22] Filed: Dec. 30, 1974

[21] Appl. No.: 537,450

[30] Foreign Application Priority Data
Dec. 28, 1973 Japan............................... 49-317

[52] U.S. Cl. ............................................. 340/172.5
[51] Int. Cl.² ............................................. G06F 3/04
[58] Field of Search ................................. 340/172.5

[56] References Cited
UNITED STATES PATENTS

| | | | |
|---|---|---|---|
| 3,226,687 | 12/1965 | Amdahl et al. | 340/172.5 |
| 3,226,688 | 12/1965 | Amdahl et al. | 340/172.5 |
| 3,226,692 | 12/1965 | Fuller et al. | 340/172.5 |
| 3,253,262 | 5/1966 | Wilenitz et al. | 340/172.5 |
| 3,566,357 | 2/1971 | Ling | 340/172.5 |
| 3,815,099 | 6/1974 | Cohen et al. | 340/172.5 |
| 3,828,326 | 8/1974 | Cash | 340/172.5 |
| 3,863,225 | 1/1975 | Preiss | 340/172.5 |
| 3,866,181 | 2/1975 | Gayman et al. | 340/172.5 |
| 3,889,236 | 6/1975 | Herger | 340/172.5 |

*Primary Examiner*—Gareth D. Shaw
*Assistant Examiner*—Melvin B. Chapnick
*Attorney, Agent, or Firm*—Staas & Halsey

[57] ABSTRACT

A selection system for an information processing system wherein a unit, such as a magnetic tape unit, is shared by a plurality of control units. At least first and second signal lines are connected between each control unit at a driver circuit and a receiver circuit pair. The two signal lines connected between each control unit correspond to a single shared unit, and each control unit provides a driver circuit and a receiver circuit connected so as to transmit and receive signals carried on each line. Each line is connected to a separate driver circuit and receiver circuit at each control units. A block signal is transmitted from one of the control units through a first signal line to the other control units to prevent them from starting their operation for accessing the shared unit, and selection signals are transmitted from possible plurality of started control units through the second signal line at different timings to thereby determine priority of the started control units for accessing the shared unit. With this system, the control units can be correctly operated in accordance with priority by simple circuit construction without employing a scanning system, and further, the number of control units can be increased without increasing the cost of the selection system.

6 Claims, 15 Drawing Figures

CTL = Control Unit
DV = Magnetic Tape Unit

D = Driver
R = Receiver

3,967,249

PRIORITY SELECTION SYSTEM IN ACCESS CONTROL

BACKGROUND OF THE INVENTION

1. Field of the Invention

This invention relates to a shared unit selection system for an information processing system, and more particularly to a shared unit selection system for an information processing system, which ensures a correct operation of a shared unit in accordance with priority of control units through the use of extremely simple circuit construction and enables an increase in the number of control units without increasing the cost of the selection system.

2. Description of the Prior Art

With the necessity of higher speeds and enhancement of reliability of an information processing system, the construction of the system has become more and more complicated. For example, a magnetic tape unit and magnetic tape control units may be employed as a shared unit and sharing units respectively. If they are connected so that one magnetic tape unit is shared by more than two magnetic tape control units, in such a manner as to be accessible from any one of the magnetic tape control units, the following advantages can be obtained.

1. The efficiency of utilization of one magnetic tape unit can be improved and information processing can be increased in speed.
2. If one of the magnetic tape control units gets out of order, the magnetic tape unit can be accessed from the other magnetic tape control units, thus diminishing the possibility of the system becoming inoperative, thereby providing enhanced reliability.
3. In order to provide a standby unit, it is sufficient to provide only one standby unit for more than two magnetic tape control units, so that the system can be constructed at low cost.

The advantages are great, but in the case where the magnetic tape unit is connected to be accessible from any out of a plurality of magnetic tape control units and the magnetic tape unit is accessed by two or more of the magnetic tape control units at the same time, due to time lag of clocks and response propagation of the magnetic control units, different instructions may be simultaneously given to the same magnetic tape unit thereby causing an erroneous operation. Accordingly, it is necessary to assign priority to the magnetic tape control units.

FIG. 1 is a diagram showing the system construction of a conventional selection system. In FIG. 1, reference character CTL indicates control units (for example, magnetic tape control units), used as sharing units; and DV designates units to be controlled (for example, magnetic tape units), used as shared units.

In accessing the shared units DV, a scanning system has heretofore been employed. The scanning element is connected in common with the plurality of control units CTLA and CTLB. In the system where the shared units are accessed by scanning, when the scanning element is out of order, all of the control units are also inoperable, thereby increasing the probability of downtime.

Further, it is also a very difficult problem of deciding how a power source is to be connected to the scanning element. If the power is supplied from a specified one of the control units CTL, the above disadvantage is encountered when the scanning element gets out of order. Alternatively, power can be supplied from a plurality of units, in common, but this method has the disadvantage of being complex in circuit construction.

Moreover, in the conventional case, where it is desired to increase the number of control units CTL, the new units cannot be easily connected to the scanning part, without modification of the circuit construction, and this modification leads to an increase in the cost of the system.

SUMMARY OF THE INVENTION

The object of the present invention is to provide a shared unit selection system which is free from the above defects experienced in the prior art, that is, a system in which an increase in the number of units does not lead to an increase in the cost of the selection system, and a system where even if the shared unit is accessed by more than two control units, a correct operation is achieved.

Briefly stated, in the system of accessing and controlling the same shared unit by a plurality of units, according to this invention, when one of the control units starts an operation for accessing the shared unit a block signal is transmitted along a first signal line for blocking the other control units from starting an operation for accessing the same shared unit. Then, when the control unit has reserved the shared unit, an access completion signal is applied to the other control units through a second signal line. Further, the shared unit access time of each control unit from the start of the accessing operation to its completion is selected to be different from those of the other control units. Therefore when at least one of the control units has transmitted a block signal to the other control units, any one of the remaining control units having already started its access operation before receiving the blocking signal will not be stopped by the blocking signal. An access operation completion signal is derived from that one of the started control units whose shared unit access time is shorter than the others, thereby stopping the access operation of the control units having longer access time and preventing them from accessing the shared unit.

In accordance with one aspect of this invention, a driver circuit and a receiver circuit, in pair, are connected to one signal line in each control unit.

In accordance with another aspect of this invention, a plurality of flip-flops or a timer circuit formed with one single-shot multivibrator is employed for determining the shared unit access time of each control unit form the start of its accessing operation to the completion.

In the above example, two signal lines are provided between the control units for each shared unit, but the present invention is not limited specifically to two signal lines and, of course, three or more signal lines can be provided. As mentioned above, in the present invention, by providing the block signal, priority of access is determined and where two control units start their accessing operation at the same time, the order of access is determined in accordance with the time for instructing a selecting signal. If the control units can be controlled so that there is no possibility of simultaneously using the shared unit by more than two control units, the signal line may be one. It might be said that one shared unit is not accessed from a plurality of control units at the same time.

3

Accordingly, in the present invention, where a plurality of control units can be so controlled as not to start at the same time on the channel side, it is sufficient only to provide one signal line between the control units; but where more than two signal lines are provided, even if simultaneous starting of two control units occurs, they can be caused to operate correctly in accordance with priority by the use of a very simple circuit construction without employing the scanning system. Further, even if the number of control units increases, very efficient control of the accessing operation can be effected without increasing the cost of the system. Therefore, this invention has great utility in practical use.

BRIEF DESCRIPTION OF THE DRAWINGS

FIGS. 5A to 7B, inclusive, are timing charts of the operation of the circuit of FIG. 4, FIGS. 5A and 5B being timing charts of the operations of control units CTL-A and CTL-B in the case where the control unit CTL-A starts earlier than CTL-B;

FIGS. 7A and 7B being timing charts of the operations of the control units CTL-A and CTL-B in the case where the unit CTL-B starts earlier than CTL-A.

DESCRIPTION OF THE PREFERRED EMBODIMENTS

Figure 1:
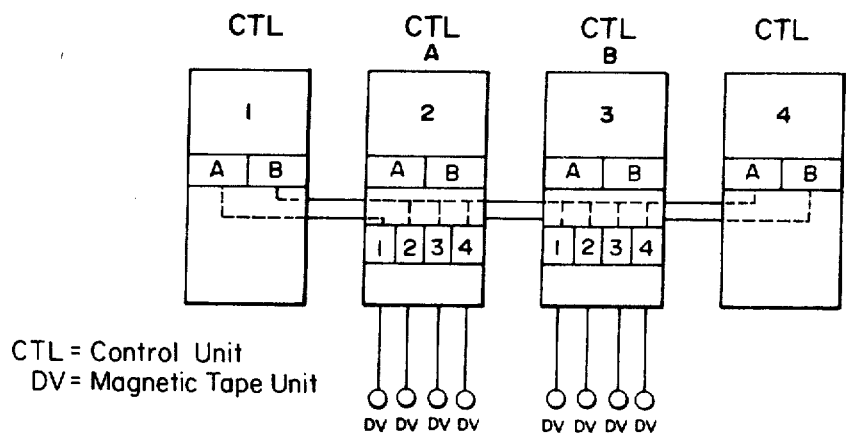
FIG. 1 is a connection diagram showing one example of conventional selection system.
Figure 2:
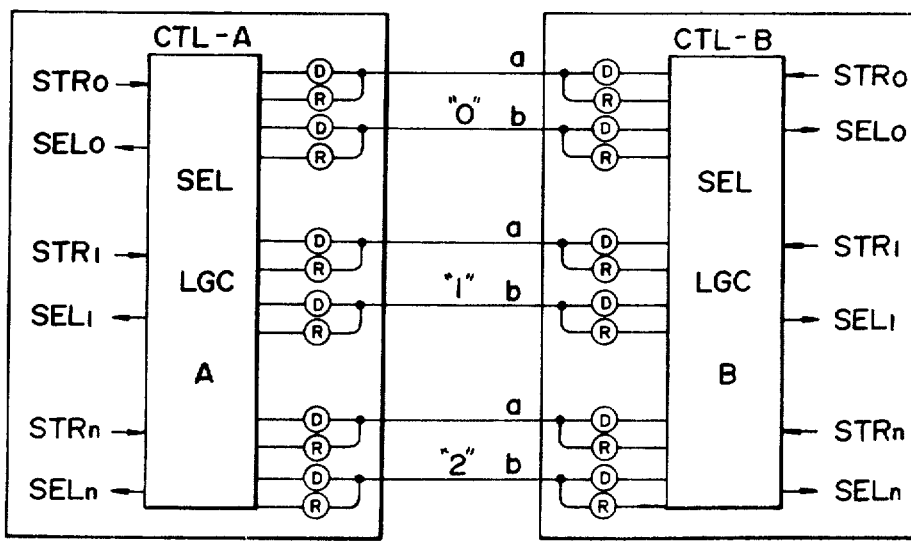
FIG. 2 is a schematic diagram illustrating one example of the selection system of this invention.

FIG. 2 shows a system construction illustrating one example of this invention, in which two control units share a plurality of units. Reference charscter D indicates conventional driver amplifier circuits, which function as transmitters; R designates conventional receivers circuits SEL.LGC.A and SEL.LGC.B identify selection logic circuits; $STR_0$ to $STR_n$ represent start signal inputs; and $SEL_0$ to $SEL_n$ denotes selection signal outputs.

The control units CTL-A and CTL-B are interconnected through signal lines, each having connected thereto the driver circuit D and the receiver circuit R in pair. Two signal lines (a block signal line a and a selecting signal line b) are provided for accessing to one shared unit DV (not shown). Upon application of one of the start input signals $STR_0$ to $STR_n$ to each of the selection logics SEL.LGC.A and SEL.LGC.B, each selection logic operates to transmit a block signal, corresponding to the channel receiving the applied start input through a corresponding first line a. If for instance, the selection logic of CTL-A starts to select the channel for which a block signal has already been transmitted by CTL-B, a block signal will not be transmitted by CTL-A, since the receiver R detects the transmitted block signal from CTL-B and subsequent selection of that channel by the control unit CTL-A is blocked. Where no block signal has been transmitted, either one of the selection logics SEL.LGC.A and SEL.LGC.B may provide a reserved signal "1" in accordance with the respective priorities of the control units CTLA and CTLB. Namely, the reserved signal of that higher priority selection logic becomes "1" earlier than that of the other, and upon detection of this reserved signal by the receiver R of the selection logic of lower priority, the block signal of this lower priority selection logic is cancelled and no reserved signal is produced therein. Further, simultaneously with generation of the reserved signal, a corresponding one of the selection output signals $SEL_0$ to $SEL_n$ is transmitted to the conrtrol unit CTL to complete access to the shared unit DV of that channel.

Figure 3:
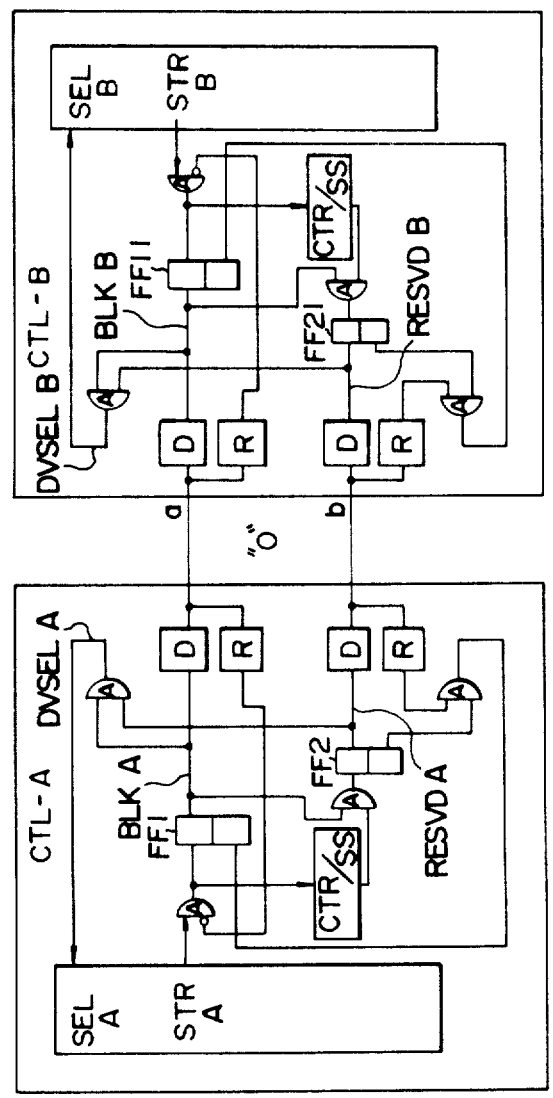
FIG. 3 is a connection diagram showing in detail control units in the example of FIG. 2.

FIG. 3 is a circuit diagram showing one example of this invention. On the side of the control unit CTL-A, where a start signal STRA is produced, it is confirmed by a NOT circuit that a block signal BLKA or BLKB has not been received by the corresponding receiver R on line a, and then the line block signal BLKA is produced and transmitted by the corresponding deriver D on line a. At the same time, a count register or single-shot multivibrator CTR/SS operates and, after queuing for a predetermined period of time, a reserved signal RESVDA becomes "1" in accordance with priority of control units CTL which is determined by the predetermined queing time. A flip-flop FF2 is set at this time. If the receiver R of the control unit CTL-A detects a block signal from the other unit before the flip-flop FF2 is set, a flip-flop FF1 is reset, thereby preventing the flip-flop FF2 from being subsequently set. Upon completion of the access, a selection signal SELA is transmitted to the control unit CTL-A by the AND of the block signal BLKA from the flip-flop FF1 and the reserved signal RESVDA from the flip-flop FF2.

On the other hand, on the side of the control unit CTL-B, the receiver R corresponding to the a detects the block signal and resets a flip-flop FF11, so that even if a start signal STRB is produced, a block signal BLKB cannot then be provided by the control unit CTL-B.

As described above, in the circuit of FIG. 3, one count register or single-shot multivibrator CTR/SS is employed for determining the time from the start of the accessing operation to the completion of the operation. That is, the time from the generation of the start signal STRA or STRB to the transmission of a corresponding selection indicating signal DVSELA or DVSELB. It is also employed for determining the final count values or delay times for pulse generation of the control units which are selected different from each other, and by which priority is determined.

Figure 4:
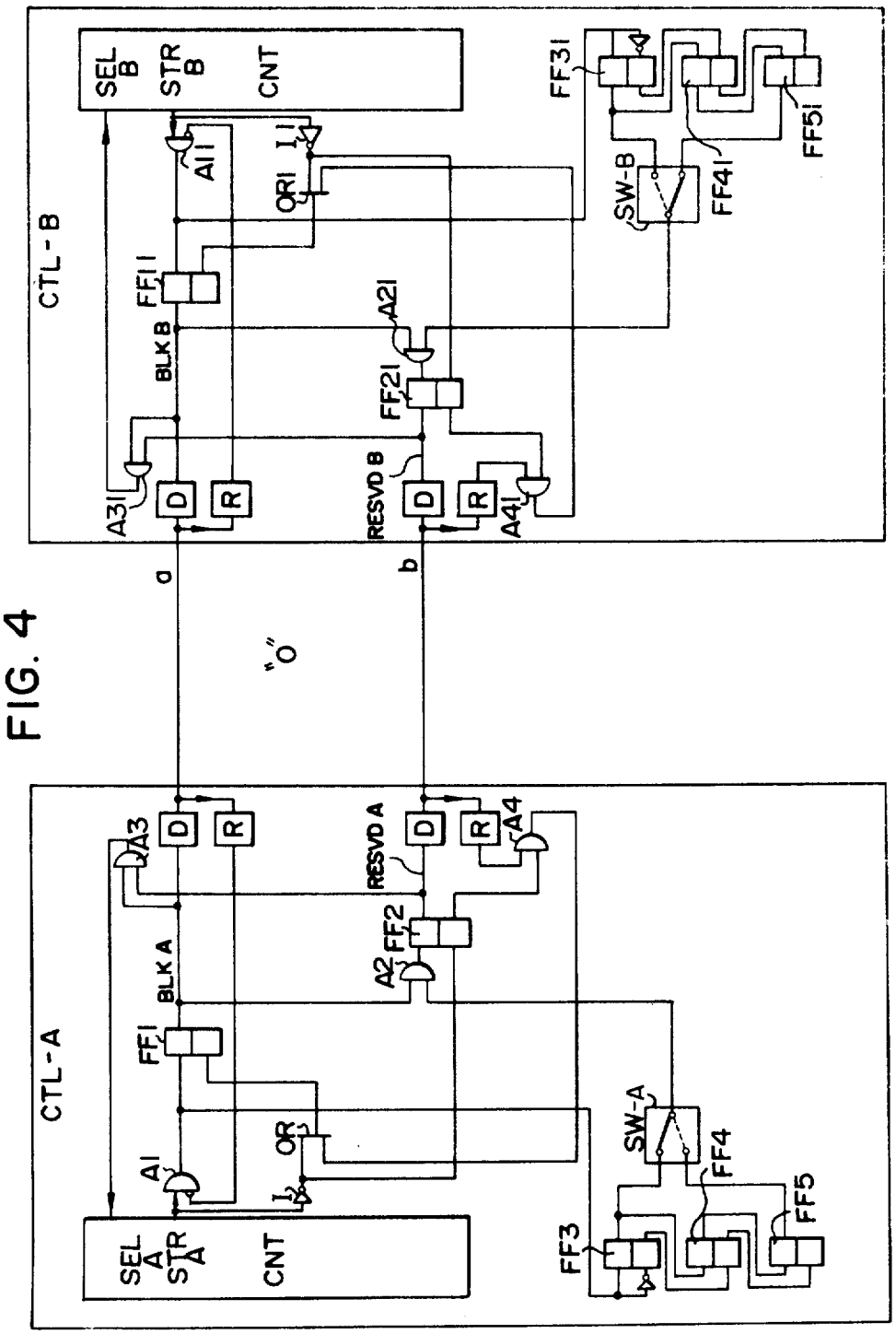
FIG. 4 is a connection diagram illustrating in detail another example of this invention.

FIG. 4 is a detailed connection diagram showing the access system in accordance with another example of this invention.

In this example, a count register is employed in each control unit and is composed of a plurality of flip-flops connected as a access time determining element. The count value of this count register is set by a switch SW.

In FIG. 4, reference characters CTL-A and CTL-B indicate respective control units; CNT designates controllers; D again identifies conventional driver circuits; R again denotes conventional receiver circuits; SELA and SELB represent selection outputs; STRA and STRB represent start signal inputs; FF1 and FF11 refer to respective block signal producing flip-flops; FF2 and FF21 indicate respective reserved signal producing flip-flops; FF3, FF4, FF5 and FF31, FF41 FF51 respectively designate flip-flops making up the above counter register; SWA and SWB identify switches for setting a count value (priority); BLKA and BLKB represent block signal; and RESVDA and RESVDB denote reserved signals.

Two signal lines $a$ and $b$ are connected between the control units CTL-A and CTL-B corresponding to the shared unit "0". The signal lines $a$ and $b$ are connected in parallel to the driver D and the receiver R.

Prior to using the control units CTL-A and CTL-B, the operator actuates the respective switches SWA and SWB to set the corresponding control unit of higher priority on the side of the flip-flops FF3 and FF31 and the unit of lower priority on the side of the flip-flops FF5 and FF51. For the sake of brevity, FIG. 4 shows the case where the number of control units is two. However, the number of control units can easily be increased by previously providing flip-flops in each control unit by the number expected to be increased, by increasing the fixed contacts of the switch SW correspondingly, and by sequentially setting the added control units on the basis of the lowest priority each time the number of control units is increased.

The signal line $a$ is provided for carrying the transmitted block signal BLK and the signal line $b$ is provided for carrying the transmitted reserved signal RESVD.

For example, when more than two control units CTL are emloyed and controlled by a clock common to them, it is not likely that one shared unit DV is used by more than two control units CTL, so that, in such a case, it is sufficient to provide only one signal line $a$. Namely, a driver and receiver pair is connected to each end of the signal line $a$, so that a block signal transmitted by the corresponding control unit CTL having started earlier than the other control units, determines the order of the control units for using the shared unit DV. In such a case, it is also possible to set priority of the control units by adjusting the time necessary for transmitting the block signal from the driver D of each control unit after the application of each of the start signals STRA and STRB.

In the above case, the signal line may be one. However, the control units CTL-A and CTL-B are usually controlled by different clocks and disposed at different positions, so that there is the possibility that both control units CTL-A and CTL-B simultaneously access one shared unit DV due to a time lag in the clocks or in signal propagation. To avoid an erroneous operation due to simultaneous starting or simultaneous transmission of block signals, it is necessary to set priority of the control units, provide another signal line $b$ for carrying each of the transmitted reserved signals RESVDA and RESVDB to prevent the block signal of the other control unit from being sent out, and connect a pair driver and receiver to each end of the signal line $b$.

In FIG. 4, the control unit CTL-A has priority over the other CTL-B. Let it be assumed that the both control units CTL-A and CTL-B start simultaneously and send out the block signals simultaneously.

When the start signals STRA and STRB are derived from both controllers CNT, they are respectively applied through corresponding AND gates A1 and A11 to corresponding flip-flops FF1 and FF11 setting them and producing the respective block signals BLKA and BLKB, since no block signal has been received on line $a$ by receivers R and sent to the corresponding AND gates A1 and A11. Then, each block signal BLK is transmitted by corresponding driver D and received by the other control unit at receiver R.

At the same time, the signals respectively having passed through the AND gates A1 and A11 are applied to the count registers for determining priority. However, in the control unit CTL-A, the signal through AND gate A1 sets the flip-flop FF3 of the count register to count only one clock and is then applied through the switch SWA to the AND gate A2. On the other hand, in the control unit CTL-B, the signal through AND gate A11 sets the flip-flop FF31 and then sets the flip-flops FF41 and FF51 one after another to thereby count three clocks, thereafter being applied through the switch SWB to the AND gate 21. Accordingly, the flip-flop FF2, having a control unit CTL-A of higher priority, is set earlier and the reserved signal RESVDA is produced. The reserved signal RESVDA is transmitted by the driver D on line $b$ to the other control unit CTL-B. Simultaneously with the transmission of the reserved signal RESVDA, the reserved signal RESVDA and the block signal BLKA transmit the selection indication SELA to the controller CNT through the AND gate A3, so that the control unit CTL-A is connected to the shared unit DV0 for the first time to start signal transmission and reception with the shared unit DV0. The subsequent operations are not related to this invention, and hence will not be described.

On the other hand, in the control unit CTL-B, the flip-flop FF21 is to be set a certain period of time after setting of flip-flop FF3 of the control unit CTL-A, that is, the period of time for setting the flip-flops FF41 and FF51 to count two clocks. However, before the flip-flop FF21 is set, the reserved signal RESVDA transmitted from the control unit CTL-A is received by the receiver R, connected to line $b$, and the received signal is applied through the AND gate A41 and the OR gate OR1 to the flip-flops FF11 to reset it. Therefore, the other input signal (BLKB) to the AND gate A21 becomes "0" and the flip-flop F21 is not set. Of course, in the control unit CTL-B, the input signal BLKB to the AND gate A31 becomes "0" and the other input signal RESVDB to the AND gate A31 remains "0", so that the selection indication SELB is not transmitted and the selection indication SELB is not provided even after the predetermined period of time. Therefore, it is known that the shared unit DV0 is being controlled by the other control unit.

If the start signals STRA and STRB are made "0", signals having passed through inverters I and II and OR gates OR and OR1 reset the flip-flops FF1 and FF11, respectively. As a result of this, the block signals BLKA and BLKB become "0" and, at the same time, the flip-flops FF1 and FF21 are also reset and the reserved signals RESVDA and RESVDB also become "0".

As described in the foregoing example of FIG. 4, the clocks of the control units CTL-A and CTL-B have time lag relative to each other and even if the control units CTL-A and CTL-B are disposed at different places, there is no possibility of one shared unit, for example, DV0, being simultaneously accessed by the both of the control units. This prevents an erroneous operation and ensures efficient accessing operation in accordance with priority.

Figure 5A:
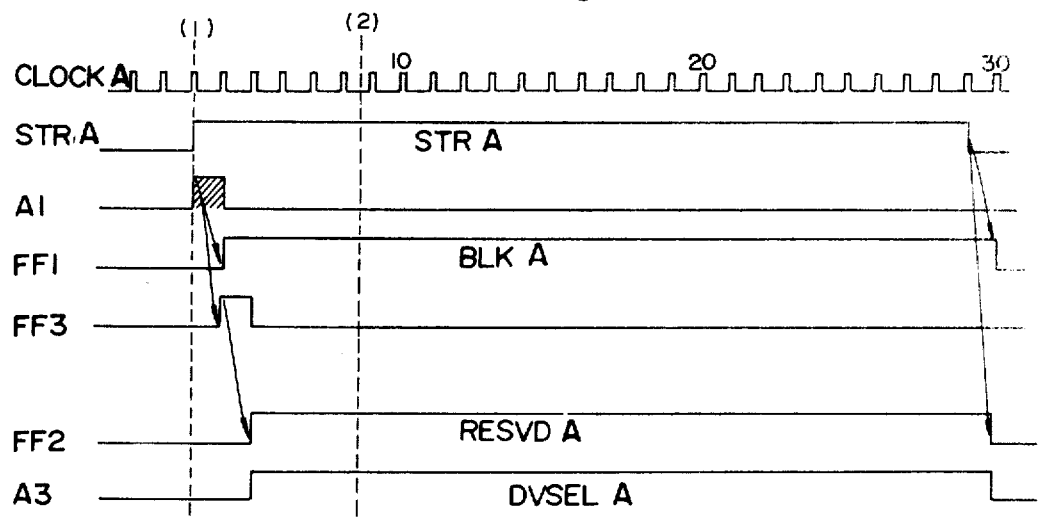
Figure 5B:
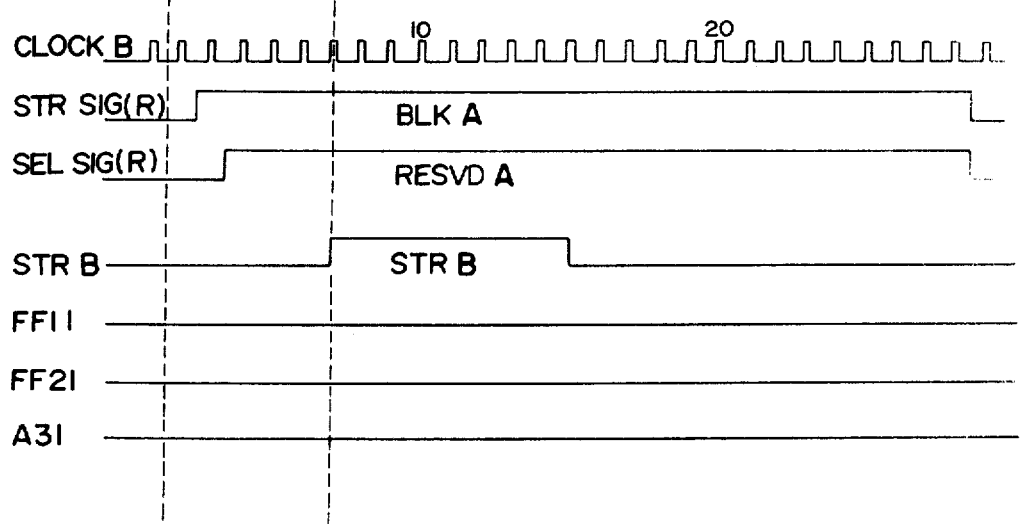

FIGS. 5A and 5B are timing charts of the operation of the circuit exemplified in FIG. 4, illustrating the case where the start signal STRA is produced earlier than STRB. FIG. 5A is a timing chart of the operations in the control unit CTL-A and FIG. 5B a timing chart of the operations in the control unit CTL-B.

Clocks A and B of the control units CTL-A and CTL-B are not synchronized with each other and, in the control unit CTL-A, the start signal STRA rises at the instant of a third clock pulse (1); and, in the control unit CTR-B, the start signal STRB rises at the instant of a seventh clock pulse (2).

In the time interval between the instants (1) and (2), the start signal STRA passes through the AND gate A1 (oblique lines in FIG. 5A) and sets the flip-flop FF1 to send out the block signal BLKA in a one-clock cycle and, at the same time, sets the flip-flop FF3 of the count register. After one count in the count register, the start signal STRA sets the flip-flop FF2 to provide the reserved signal RESVDA and, at the same time, passes through the AND gate A3 to provide the selection indicating signal DVSELA.

In the control unit CTL-B of FIG. 5B, before the start signal STRB rises, the block signal BLKA and the reserved signal RESVDA are transmitted thereto through the signal lines $a$ and $b$ respectively, so that the signals received by the corresponding receivers reset the flip-flop F11 through the AND gate A41 and the OR gate OR1 in FIG. 4 and, at the same time, apply an input "0" to the other input of the AND gate A11, as described above. As a result of this, even if the start signal STRB is produced at the instant (2), no input is applied from the AND gate A11 to the flip-flop FF11 and the flip-flop F11 remains in its reset state.

Since the selecting indication singal DVSELB is not applied to the controller CNT of the controlled unit CTL-B even after a predetermined time (8 clock cycles) has elapsed, the controller CNT knows that the other control unit CTL-A has reserved the shared unit DV0, and stops the start signal STRB.

Further, the controller CTT of the control unit CTL-A stops the start signal after the elapse of a predetermined period of time or after the control unit CTL-A has been connected to the shared unit DV0 (26 clock cycles after the rise of the start signal STRA), by which the flip-flops FF1 and FF2 are reset to respectively restore the block signal BLKA, the reserved signal RESVDA and the selection indicating signal DVSELA to "0".

Figure 6A:
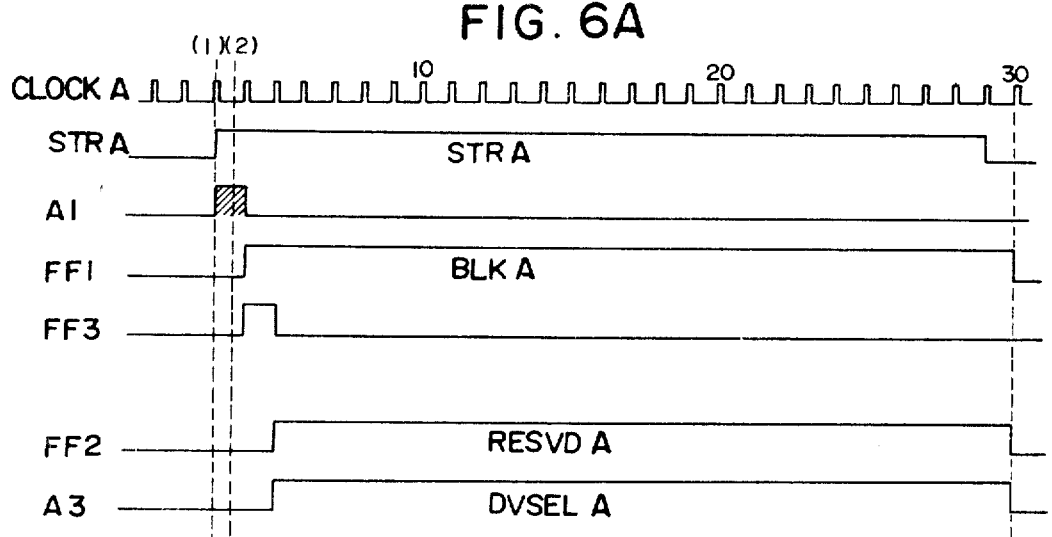
FIGS. 6A and 6B being timing charts of the operations of the control units CTL-A and CTL-B in the case where the both units start at the same time.
Figure 6B:
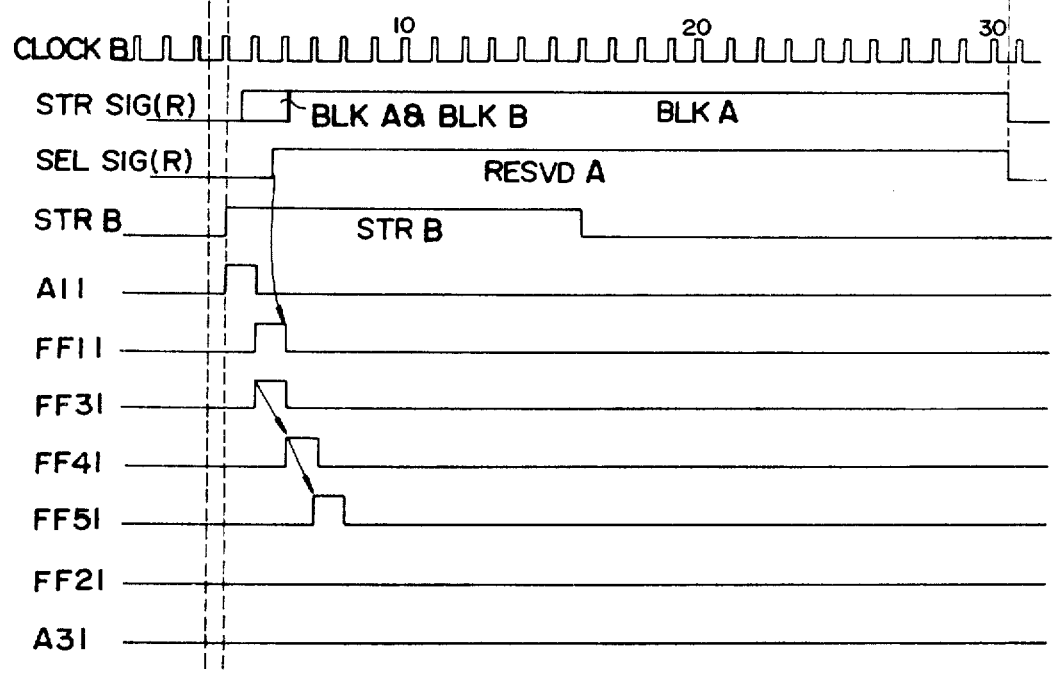

FIGS. 6A and 6B are time charts of the operations in the control units CTL-A and CTL-B in the case where the start signals STRA and STRB rise substantially at the same time in the circuit of FIG. 4.

In FIGS. 6A and 6B, the start signals STRA and STRB rise substantially simultaneously at an instant of a third clock (1) and at an instant of a fourth clock (2). It must be noted here that, in the control unit CTL-A, the time interval between the rise of the start signal STRA and the rise of the reserved signal RESVDA is two clock cycles but that, in the control unit CTL-B, this time interval is four clock cycles.

When the start signal STRA rises, the flip-flop FF1 is set and the block signal BLKA is transmitted from the driver D of the control unit CTL-A to the receiver R of the control unit CTL-B on the signal line $a$. At the same time, the flip-flop FF3 of the count register is set and, after counting one clock, the flip-flop FF2 is set to produce the reserved signal RESVDA.

In the control unit CTL-B, the block signal BLKB is transmitted from the driver D to the receiver R of the control unit CTL-A on the signal line $a$ in exactly the same manner as in the control unit CTL-A.

Consequently, as indicated by STR SIG(R) in FIG. 6B, the block signals BLKA and BLKB are simultaneously transmitted on the signal line $a$. In the control unit CTL-A, the count register sets the flip-flop FF2 after flip-flop FF3 counts one clock pulse, as described previously. However, in the control unit CTL-B, the count register applies its output to the AND gate A21 after the flip-flops FF31, FF41 and FF51 count three clock pulses. At that instant, the reserved signal RESVDA has already been transmitted from the control unit CTL-A to the receiver R of the control unit CTL-B on the signal line $b$, and the signal received by the receiver R has reset the flip-flop FF11 through the AND gate A41 and the OR gate Or1, thereby cancelling the block signal BLKB and preventing the selection by the control unit CTL-B. At that same instant, the block signal BLKB is "0" and the output from the AND gate A21 is also "0". Consequently, the flip-flop FF21 is not set by the output of the count register. After a predetermined period of time (12 clock cycles in this example), the controller CNT of the control unit CTL-B confirms that the selection indicating signal DVSELB is not present, and then stops the start signal STRB.

In the control unit CTL-A, as shown in FIG. 6A, the reserved signal RESVDA begins two clock cycles after the beginning of the start signal STRA and the selection indicating signal DVSELA having passed through the gate A3 simultaneously with beginning of the reserved signal RESVDA is transmitted to the controller CNT, by which the shared unit DVO is reserved.

The count registers are constructed in due consideration of the time lag of clock pulses, the signal transmission time, the response time of the elements, etc. The count number of the count register of the control unit having the highest degree of priority is selected "0" and the numbers of the control units of lower priority are selected to be greater as the priority becomes lower.

In the case of employing single shot multivibrators in place of the count registers, the delay time for pulse generation is adjusted, and the waiting time of the single shot multivibrator of the control unit having the highest degree of priority is selected as "0". The waiting time is selected to be longer as the degree of priority becomes lower.

Figure 7A:
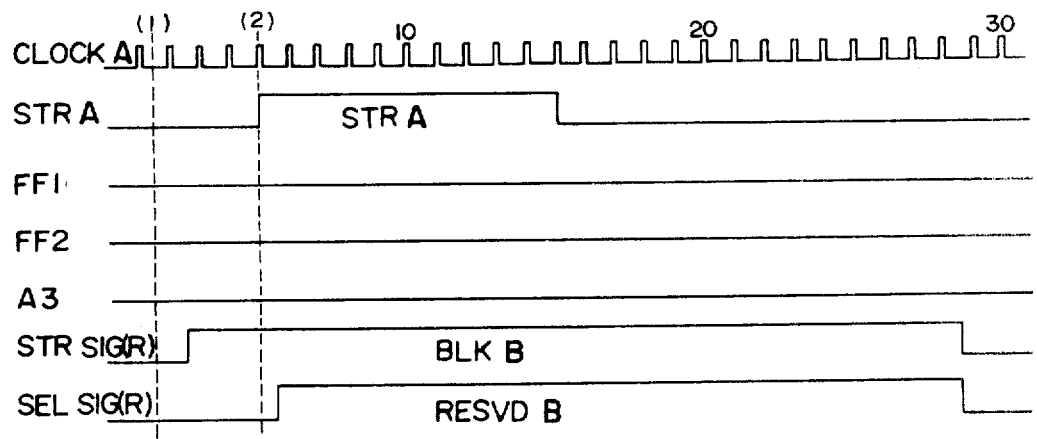
Figure 7B:
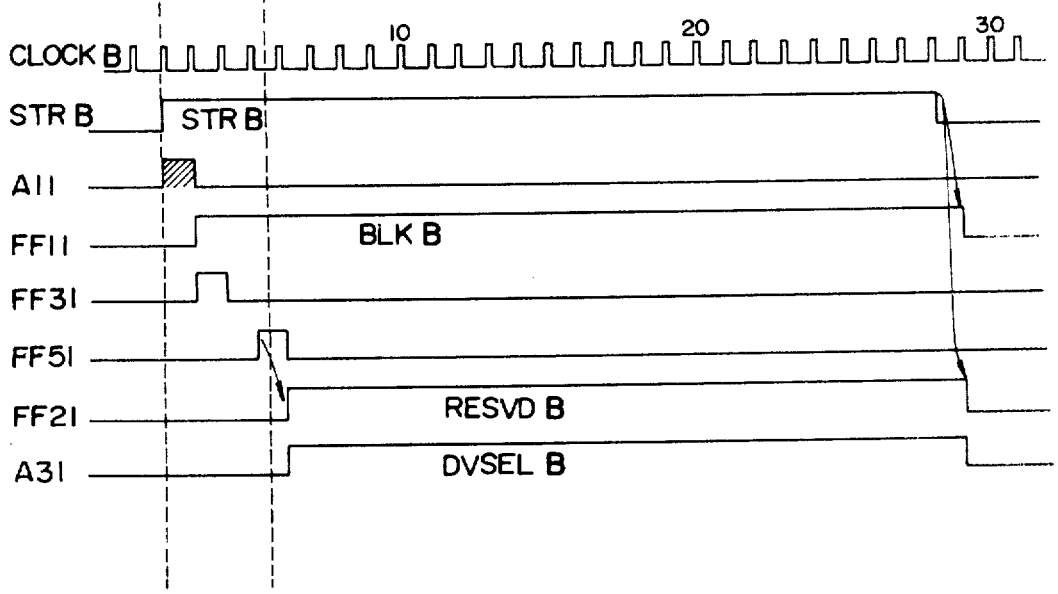

FIGS. 7A and 7B are timing charts of the operations of the circuit of FIG. 4, illustrating the case where the start signal STRB rises earlier than the start signal STRA.

Assuming that the start signal STRA rises at an instant of a fifth clock pulse (2) in FIG. 7A and that the start signal STRB rises at an instant of a second clock pulse (1) in FIG. 7B, and the time interval between the instants (1) and (2) is 3.5 clock cycles.

At first, in FIG. 7B, the start signal STRB passes through the AND gate A11 for one clock cycle, setting the flip-flop FF11, which starts the clock signals BLKB and, at the same time, setting the flip-flop FF31 of the count register. After counting three clock pulses from the flip-flops FF31 to FF51, (four clock cycles after generation of the start signal STRB), the flip-flop FF21 is set to begin the reserved signal RESVDB.

On the other hand, in FIG. 7B, at the instant (2) when the start signal STRA rises, the block signal BLKB has already been transmitted to the receiver R from the control unit CTL-B on the signal line *a* and the signal received by the receiver R prevents the start signal STRA by the NOT circuit of the AND gate A1 being prevented from setting the flip-flop FF1, even if the start signal STRA begins. Therefore, the block signal BLKA is not produced in the control unit CTL-A. Furthermore, after three clock cycles, the reserved signal RESVDB is transmitted on the signal line *b*, so that a reset signal enters the flip-flop FF1 and cancels the block signal BLKA that may have been produced. Since the control unit CTL-A is controlled by the block signal BLKB and the reserved signal RESVDB respectively transmitted on the signal lines *a* and *b*, as described above, an erroneous operation of duplicate control is completely prevented.

In FIG. 7A, the controller CNT confirms that the selection indicating signal DVSELA is not applied thereto and ten clock cycles after, it stops the start signal STRA.

On the other hand, the controller CNT of the control unit CTL-B in FIG. 7B recognizes that the shared unit DV0 can be accessed because the selection indicating signal DVSELB is applied, and connects the control unit CTL-B with the shared unit DV0 to control it. After a predetermined period of time, that is, after 26 clock cycles in FIG. 7B, the controller CNT stops the start signal STRB, so that the flip-flops FF11 and FF21 are reset and the block signal BLKB, the reserved signal RESVDB and the selection indicating signal DVSELB are cancelled.

Figure 8:
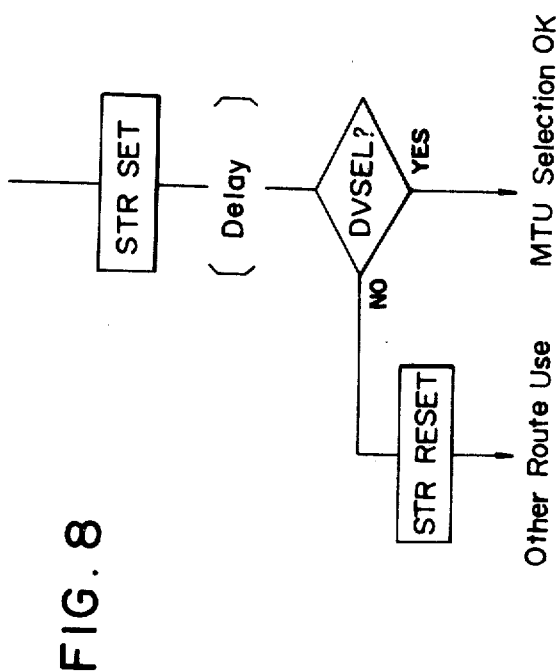
FIG. 8 being a flow chart showing the control operation of a controller CNT in FIG. 4.

FIG. 8 is a logic flow chart of the control operation of the controllers CNT in FIG. 4.

In the controllers CNT, in order to access the shared unit, start setting (STR SET) is achieved to provide the start signals STRA and STRB and, after a predetermined period of time, it is judged whether the selection indicating signal DVSEL has been produced or not. If the signal DVSEL has not been produced (NO), start resetting (STR RESET) is effected for stopping the start signals STRA and STRB, by which it is recognized that the shared unit is used by another route (Other Route Use). If the selection indicating signal DVSEL has been provided (YES), it is recognized that the sharing unit, for example, a magnetic tape unit can be accessed (MTU Selection OK).

The start signals STRA and STRB are continuously produced, even after selection. FIGS. 5A, 6A and 7B, show the case of stopping the start signals after the elapse of 26 clock cycles, but it is not necessary to provide the start signals for such a long period of time. It is also possible to send out the block signals BLKA and BLKB for a short period of time and hold only the flip-flops FF2 and FF21 for a relatively long period of time. In this case, only the set outputs of the flip-flops FF2 and FF21 are transmitted as the selection indicating signals DVSELA and DVSELB to the controllers CNT.

Figure 9:
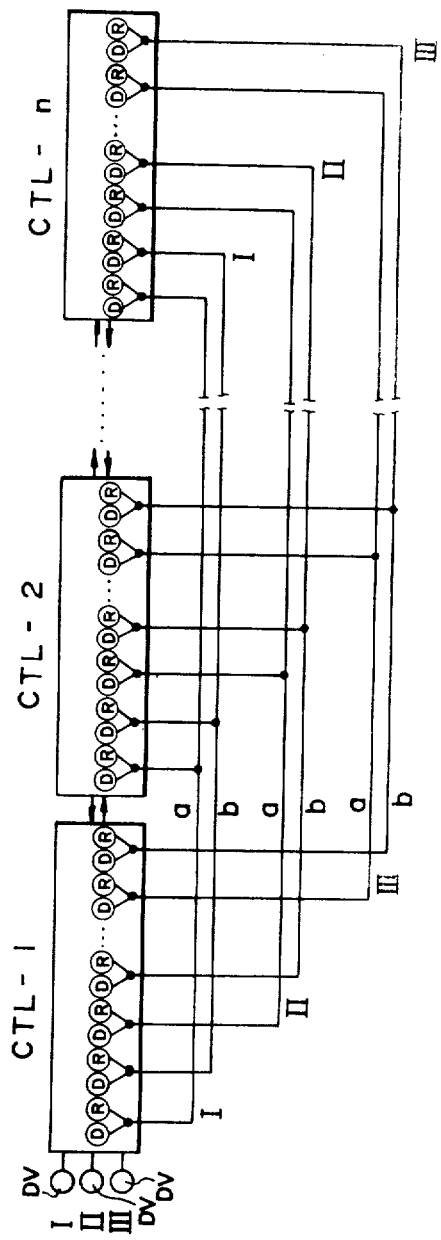
FIG. 9 is a connection diagram showing another example of this invention in which more than two control units are used.

FIG. 9 is a connection diagram in the case where more than three control units are provided. In FIG. 9, reference characters CTL-1, CTL-2, CTL-3, . . . and CTL-n indicate control units; and DVI, DVII and DVIII designate shared units. Lines I, II and III are block signal lines *a* and selection signal lines *b* corresponding to the shared control units, respectively.

In FIG. 9, three shared units DV are provided but, in the case of providing more than three control units, it is sufficient only to arrange a corresponding number of pairs of lines *a* and *b* and provide two pairs of drivers and receivers.

In FIGS. 3 and 4, this invention has been described with regard to the case where two control units are employed, but this invention is not limited specifically thereto and rather produces a great effect in the case of more than two control units CTL being used.

In FIG. 9, two signal lines *a* and *b*, each having connected thereto a driver D and a receiver R pair, are connected among the control units CTL-1 to CTL-n for access to each shared unit DV. In the case of selecting a certain channel of the shared units (DVI for example), a first block signal is instructed and transmitted on the block signal line I-a to the receiver R of each control unit CTL, thereby blocking access of the other control units to the shared unit DVI. The control unit CTL having transmitted the block signal instructs and transmits a reserved signal after queuing for a predetermined period of time. In the case where two or more control units CTL instruct and transmit block signals, the control unit which also instructs and transmits the reserved signal earlier than the other units has priority of access over the corresponding shared unit of the other control units. Namely, the times for instructing the reserved signal are determined in accordance with the predetermined priority of the control units.

Figure 10A:
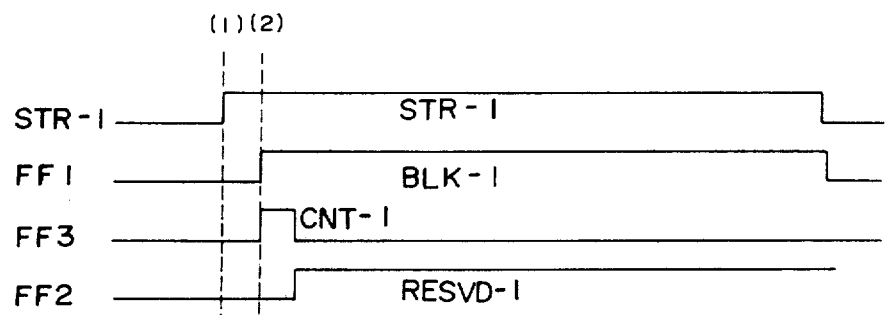
FIGS. 10A, 10B and 10C are timing charts of the operations of the control units CTL-1, CTL-2 and CTL-3 of FIG. 9, in the case where they start at the same time.
Figure 10B:
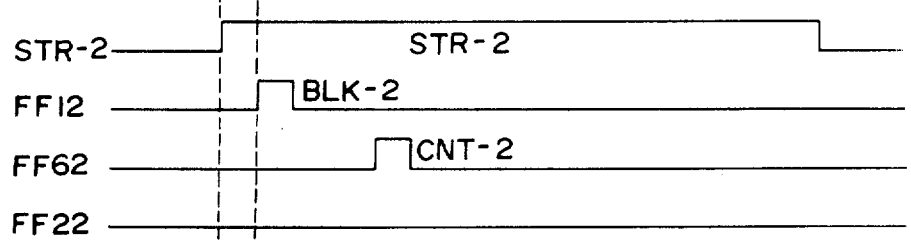
Figure 10C:
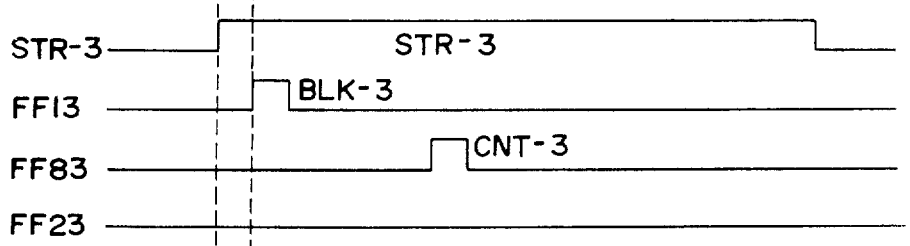

FIGS. 10A, 10B and 10C are timing charts of the operations of the control units CTL-1, CTL-2 and CTL-3 in the circuit of FIG. 9, showing the case where the control units have started simultaneously.

Let it be assumed that priority of the control unit CTL-1 is the highest, that priority becomes lower in the order of CTL-2 and CTL-3 and that priority of the other control units CTL-n is lower than the control unit CTL-1. As the means for determining priority, flip-flops of a count register are employed as is the case with the example of FIG. 4. The control units CTL-1, CTL-2 and CTL-3 have a queuing time for only one clock cycle of the flip-flop FF3, a queuing time for four clock cycles of the flip-flops FF32 to FF62 and a queuing time for six clock cycles of the FF33 to FF83, respectively.

In FIGS. 10A, 10B and 10C, when start signals STR-1, STR-2 and STR-3 are simultaneously produced at an instant for accessing the shared unit DVIII, these signals set the flip-flops FF1, FF12 and FF13 respectively to provide block signals BLK-1, BLK-2 and BLK-3, which are applied to the same signal line IIIa. Accordingly, the three block signals BLK-1, BLK-2 and BLK-3 are transmitted on the above signal line IIIa. The start signals STR-1, STR-2 and STR-3 simultaneously start the respective count registers. In FIG. 10A, immediately after counting one clock, the flip-flop FF2 is set by a count signal CNT-1 to provide a reserved signal RESVD-1. On the other hand, in FIGS. 10B and 10C, after counting four and six clocks respectively, count signals CNT-2 and CNT-3 are each sent out to the AND gates, but by that time the reserved signal RESVD-1 of FIG. 10A has already been transmitted to receivers R of the other control units CTL-2, CTL-3, . . . and CTL-n on the signal line IIIb, so that the block signals BLK-2 and BLK-3 previously produced are cancelled. Consequently, the flip-flops FF22 and FF23 cannot be set through the AND gates for the transmission of reserved signals.

In this manner, the shared unit DVIII is accessed by the control unit CTL-1.

In short, the control unit CTL which provides the start signal STR earlier than the other control units can preferentially access the shared unit DV. However, in the case where the start signal STR is produced in each of two or more control units CTL, the control unit having higher priority and which has instructed the reserved signal earlier than the other units, can preferentially access the shared unit.

By previously providing the same number of pairs of drivers and receivers to the final number of shared units DV in each control unit CTL, shared units can easily be increased. In such a case, if a multiplexer circuit is constructed or where the shared units DV are increased, except for the pairs of drivers and receivers and the signal lines a and b, the flip-flops and count registers can be used in common.

Further, a desired number of control units CTR can be provided and, in such case, it is sufficient only to connect signal lines to the newly provided control units, so that an increase of the shared units can be easily achieved without increasing the cost. Moreover, by using the MSI as the count register or single-shot multivibrator for determining priority, it is sufficient to provide only one MSI irrespective of the increase of the shared units.

In the case of determining priority, it is not always necessary that the control unit with shorter access time, which is defined as the control unit of which is required to count the smaller number of clock pulses or shorter queuing time, has priority over the other control units of longer access time. It is also possible that priority of the control unit sharing longer access time be made higher than the control units of shorter access time by cancelling the reserved signal and the block signal of the control circuit having completed its counting earlier than any other control unit.

It will be apparent that many modifications and variations may be effected without departing from the scope of the novel concepts of this invention. Therefore, it is intended by the appended claims to cover all such modifications and variations which fall within the true spirit and scope of the invention.

We claim as our invention:

1. A selection system for an information processing system comprising in combination:

a shared unit;

a plurality of control units connected to said shared unit, for accessing said shared unit, wherein each of said plurality of control units includes means for generating a block signal when that corresponding control unit starts its operation, means for generating a reserved signal when said corresponding started control unit completes its operation and commences accessing said shared unit, and a time delay means connected to said block signal generating means for defining an operation time of said corresponding control unit from said start to said completion and controlling said reserved signal generating means, the respective time delay means of said plurality of control units defining respectively different operations times for each of said plurality of said control units;

a first signal line connected in common to each of said plurality of control units for conveying said block signals;

a second signal line connected in common to each of said plurality of control units for conveying said reserved signals;

each control unit, further including first transmitting means for transmitting a block signal generated by its corresponding block signal generating means, when said control unit has started its operation, over said first signal line to all other said control units, and first receiving means for receiving said transmitted block signals conveyed on said first signal line and preventing said corresponding control unit from subsequently starting its respective operation;

each control unit also includes second transmitting means for transmitting a reserved signal generated by its corresponding reserved signal generating means, when said control unit has completed its operation, over said second signal line to all other said control units, and second receiver means for receiving said transmitted reserved signals conveyed on said second signal line and preventing said corresponding control unit from completing its operation;

said selection system is characterized by the control unit having the shortest said operation time, of said plurality of control units which have been started, being the first to transmit a reserved signal, thereby preventing all others of said plurality of control units from completing their corresponding operations.

2. A selection system according to claim 1, wherein said time delay means includes a flip-flop circuit connected to receive said block signal from said corresponding block signal generating means.

3. A selection system according to claim 1, wherein said time delay means includes a single-shot multivibrator, having a different pulse generation delay time for each of said plurality of said control units and connected to receive said block signal from said corresponding block signal generating means.

4. A selector system for an information processing system of claim 1, wherein said shared unit is a magnetic tape unit and said plurality of control units are magnetic tape control units.

5. A selection system for an information processing system comprising:

a plurality of shared units;

a plurality of control units, each respectively connected to said plurality of shared units for accessing said shared units, wherein each control unit includes means for defining an operation time as the time duration from the start to completion of the accessing operation, a plurality of means for generating a blocking signal respectively corresponding to a different one of said plurality of shared units, means corresponding to said blocking signal generating means for generating a reserved signal, means corresponding to said blocking signal generating means for transmitting a blocking signal generated by said corresponding blocking signal generating means to the others of said plurality of said control units, means corresponding to said blocking signal transmitting means for receiving said transmitted blocking signal, means corresponding to said reserved signal generating means for transmitting a reserved signal generated by said corresponding reserved signal generating means to the others of said plurality of said control units, means corresponding to said reserved signal transmitting means for receiving said transmitted reserved signal;

a plurality of first signal lines respectively corresponding to said plurality of shared units, each of said first signal lines being connected to corresponding blocking signal transmitting means and blocking signal receiving means at each control unit;

a plurality of second signal lines respectively corresponding to said plurality of shared units, each of said second signal lines being connected to corresponding reserved signal transmitting means and reserved signal receiver means at each control unit;

wherein the output of each said blocking receiving means being connected to said corresponding blocking signal generating means to inhibit the generation of said blocking signal when said blocking signal receiving means receives a blocking signal from another control unit;

the output of each said reserved signal receiving means being connected to said reserved signal generating means to inhibit the generation of said reserved signal when said reserved signal generating means receives a reserved signal from another control unit;

further wherein, each said control unit, when starting its operation for accessing a given shared unit, causes the blocking signal generating means thereof corresponding to said given shared unit to generate a blocking signal and said corresponding blocking signal transmitting means to transmit said blocking signal on said corresponding first signal line to all other control units, thereby preventing other said control units from subsequently starting their respective operations for accessing said given shared unit; and the corresponding reserved signal generating means, of each said control unit which has started its operation for accessing the said given shared unit; generating a reserved signal at the end of the corresponding operation time for said control unit and said corresponding reserved signal transmitting means transmitting said reserved signal over said corresponding second signal line to all other control units, thereby preventing all other control units which have started their operation for accessing said given shared unit from completing their operations.

6. A selection system as in claim 5, wherein said shared units are magnetic tape units and said control units are magnetic tape control units.

* * * * *

UNITED STATES PATENT OFFICE
CERTIFICATE OF CORRECTION

Patent No. 3,967,249                                    Dated June 29, 1976

Inventor(s) Yukio Taniyama et al.

It is certified that error appears in the above-identified patent and that said Letters Patent are hereby corrected as shown below:

Column 4, line 25, delete "line" second occurrence.

Column 4, line 32, "queing" should read -- queuing --.

Column 7, line 39, "CTT" should read -- CNT --.

Signed and Sealed this

Twenty-third Day of November 1976

[SEAL]

Attest:

RUTH C. MASON
*Attesting Officer*

C. MARSHALL DANN
*Commissioner of Patents and Trademarks*